Sept. 16, 1969     A. ZATHURECZKY ET AL     3,467,364
WATER-FILM COOLING-TOWER WITH TRANSVERSE AIRFLOW
Filed April 12, 1966                              2 Sheets-Sheet 1

ÁRPÁD ZATHURECZKY
ANDRÁS EGYEDI
            INVENTORS

BY Irvin S. Thompson
                    ATTY.

Sept. 16, 1969   A. ZATHURECZKY ET AL   3,467,364
WATER-FILM COOLING-TOWER WITH TRANSVERSE AIRFLOW
Filed April 12, 1966   2 Sheets-Sheet 2

ÁRPÁD ZATHURECZKY
ANDRÁS EGYEDI
INVENTORS

BY Irvin S. Thompson
ATTY

United States Patent Office 3,467,364
Patented Sept. 16, 1969

3,467,364
WATER-FILM COOLING-TOWER WITH
TRANSVERSE AIRFLOW
Árpád Zathureczky and András Egyedi, Budapest, Hungary, assignors to "Licencia" Talalmanyokat Ertekesito Vallalat, Budapest, Hungary, a Hungarian enterprise
Filed Apr. 12, 1966, Ser. No. 542,042
Claims priority, application Hungary, Apr. 26, 1965, IA-462
Int. Cl. F28c 1/00
U.S. Cl. 261—24         1 Claim

ABSTRACT OF THE DISCLOSURE

A cooling tower having upright, flat contact plates disposed in confronting relation with each other and liquid distributing elements of inverted Y-shape closely spaced to said plates to distribute liquid thereon in the form of flat films.

---

Figure 1:
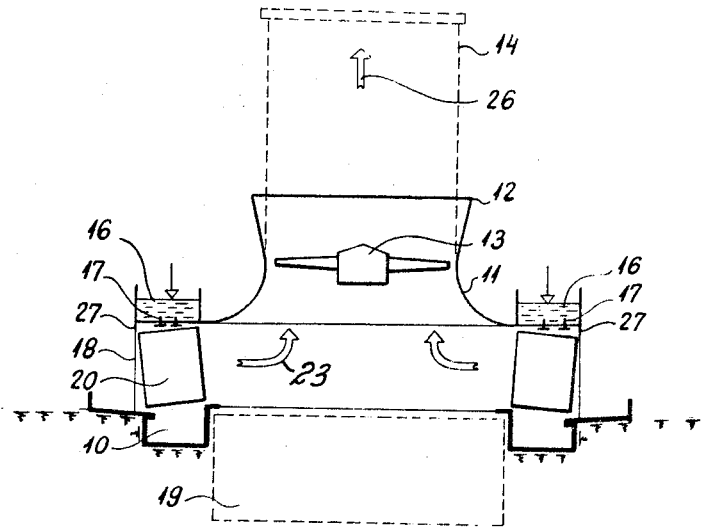

This invention relates to improvements in cooling towers. Several systems of water cooling towers are known which work on the evaporation principle. There are water cooling towers which use a counterflow, others which use a transverse flow and again others which use a combination of both in operation. Most widely used are water cooling towers in which the water to be cooled is fed counter to the flow of cooling air. It automatically results from these that for structural reasons the water has to be conducted to a relatively high level, which causes high investment costs and also involves more work for pumps.

In order to avoid these disadvantages water cooling towers with a transverse flow have been introduced. This solution, however, has the disadvantage that the calorific efficiency of the heat exchange between the water and the cooling air becomes too low. In the transverse flow systems the surface of the water particles can indeed not be sufficiently utilised and the flowing air entrains water particles which are thus lost for the cooling process.

In order to separate the water particles entrained by the flowing air therefrom, costly devices creating a considerable air resistance have to be fitted in the cooling tower.

It is the object of the present invention—whilst eliminating the above-mentioned disadvantages—to provide a transverse flow water cooling tower which works with a small loss of water and whose investment and operating costs are lower than those of known water cooling towers.

The invention is based on the recognition that a water film is formed by the water to be cooled and the cooling air introduced is fed transversely to the direction of flow of this water film, the water particles being completely separated from the path of the cooling air which can only come into contact with a film of water.

Accordingly, the invention is concerned with a water film cooling tower with transverse flow, and provides a cooling tower having an air intake aperture disposed outwardly of the horizontal projection of means serving in operation to create an airflow, cooling surfaces arranged to have a film of water flowing over them by gravity mounted in said aperture and airflow paths arranged to provide a flow of air transverse to the water films, means being provided above said flow paths which serve in operation to form said water film and to exclude particles of water from the airflow.

The cooling tower according to the invention is provided with a conduit system disposed above the cooling surfaces and distributing the water to be cooled, and a conduit system disposed beneath the cooling surfaces and collecting the cooled water.

The water film cooling towers with a transverse flow according to the invention make a grouped arrangement thereof possible, i.e. such that a separate water distributing and water collecting system for the cooling tower system can be dispensed with. Accordingly, in a series of cooling towers assembled from water film cooling towers according to the invention, the water distributing and water collecting ducts of the individual towers form at the same time the water distributing and water collecting system of the series of cooling towers.

Already the assembly of a cooling tower according to the invention thus involves a considerable saving of investment costs. These investment costs are equal to about half the present costs and the coniderable reduction of the hitherto necessary high level at which the water is fed also becomes noticeable in the expenditure on the operation of the pumps, where likewise a substantial saving results. The space requirement and necessary costs of equipment associated with the cooling tower—for example water pipes, distributing and collecting ducts, collecting tank, cable ducts, etc.—is likewise reduced by the proposal according to the invention. The operation and upkeep of the installation are thus not only simplified but also become much cheaper.

The significance of a film formation of the conducted water resides in the fact that the loss of water is thereby considerably reduced. In some of the known installations, the water is not made into a film but is sprayed; in the water film cooling towers with a transverse flow the air introduced not only encounters the water film but also the water particles. In these known installations the flowing air entrains the smaller water particles and an evaporated quantity escapes from the circulating water without any useful cooling action since the entrained water particles can no longer be re-cycled in the system.

In contrast thereto, this loss of water is eliminated in the tower according to the invention since the cooling air can only come into contact with the water film, i.e. over a relatively large surface, as a result of which a powerful cooling action is achieved. Experiments prove that due to the film formation of the water to be cooled and due to the perpendicular flow of the cooling air to this water film surface, the loss of water particles can be completely eliminated. The saving effected thus amounts to 15% of the entire loss of water of the known installations.

The installation according to the invention can be used anywhere where cooling towers of known systems are used. Also in places where only limited space is available, the erection of a cooling tower according to the invention is possible, i.e. in such a manner that a pump housing is mounted beneath the cooling tower, in the centre of the water collecting system.

Figure 2:
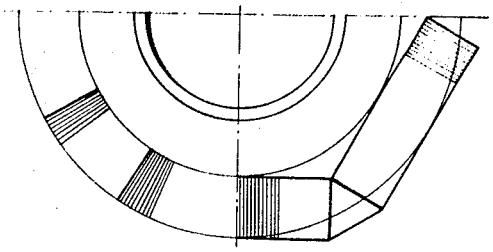
Figure 3:
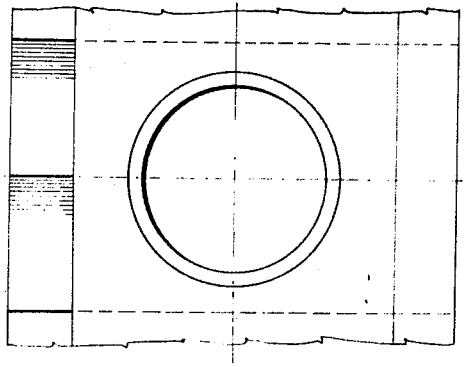
Figure 5:
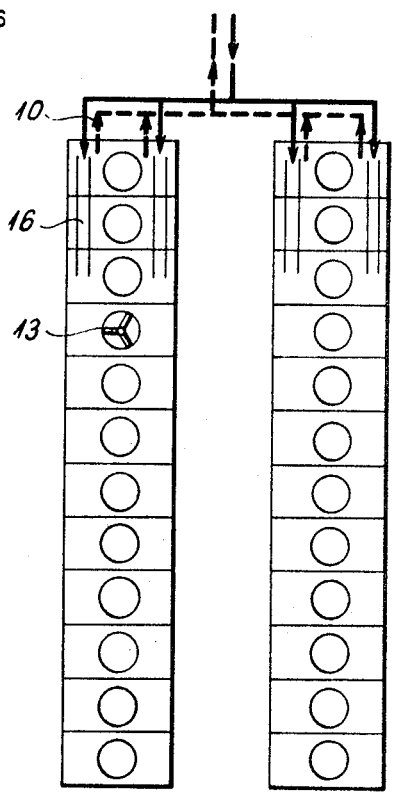
Figure 4:
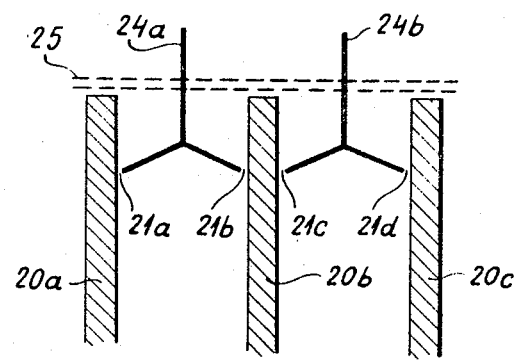

The invention will now be further described with reference to the accompanying drawings, in which:

FIG. 1 is a section through an embodiment by way of example of a cooling tower according to the invention, in front view, FIG. 2 is a partly circular and partly polygonal embodiment of a cooling tower, in top plan view, FIG. 3 is an embodiment of a cooling tower according to the invention, with parallel sides, in top plan view, FIG. 4 shows the film-forming element of a cooling tower according to the invention to a larger scale, and FIG. 5 is a plan view of a series of cooling towers, assembled from cooling towers according to the invention, as shown is FIG. 3.

The cooling device of the cooling tower according to the invention, shown in FIG. 1, is mounted above a water collecting tank or water collecting duct system. The support structure or wall 11 of the cooling tower is provided with an air conduit 12 which is necessary for the flow of the cooling air, as well as—in the case of the embodiment shown in FIG. 1—a blower 13 ensuring a forced flow of air. An air conduit 14—indicated in broken lines—is fitted in those cases where the airflow is maintained in a natural manner by gravity.

The water to be cooled is fed into the water distributing duct 16 of the cooling towers, from which the water to be cooled runs off through a bottom aperture 17. Between the duct 16 and a collecting tank or collecting duct 10 storing the cooled water, there is provided an air intake aperture or an air-conducting section 18 of the cooling tower. In the embodiment shown, the film-forming cooling surfaces—in this case the cooling plates 20—are provided in the air-intake aperture 18.

The structural members of the film-forming cooling plates 20, as well as the film-forming element are shown to a larger scale in FIG. 4. Elements 24a and 24b of inverted Y-shape extend between the cooling plates 20a, 20b and 20c which effect the film formation. Between the cooling plates 20 and the Y-elements, clearances or narrow slots 21a, 21b, 21c, and 21d, are left. The sizes of the clearances are to be chosen of the order of magnitude of millimetres. Accordingly, the water arriving from the duct 16 via the bottom aperture 17 and via various water distributing elements at the element 25, is distributed correspondingly between the cooling plates 20a, 20b and 20c and over the Y-elements 24a and 24b. There the water penetrating into the narrow gaps 21a, 21b, 21c, and 21d, is formed into a film and—flowing on the cooling plate 20 in the form of a film—since this film formation is continued by means of its flow effected by gravity, the water comes into contact with the air flowing at right angles to the direction of the film over a large surface as shown in the drawing. The elements 24a and 24b at the same time prevent penetration of air into the space in which it might encounter water particles. A penetration of air flowing in the direction of arrow 23 into the space between the water distributing duct 16 and the elements 24 disposed between the cooling plates 20, is prevented from the front by an edge seal or closure means 27.

In the embodiment shown, the cooling plates 20 are tilted with their upper parts inclined in a direction opposed to the direction of flow of air corresponding to arrow 23. This inclined position ensures that the cooling plates 20 effecting the film formation, are used as cooling surfaces over their entire surface. The flow of the water effected by gravity is indeed not quite vertical due to the action of the horizontal flow of the cooling air. With cooling plates in the vertical position, the lower part adjacent to the front edge would indeed remain without a film, whereupon the film would move away from the lower part of the plate and thus cause a loss of water particles. The inclined position of the front and rear edges of the cooling plate should be so chosen that they extend parallel to the resultant of the vector of the air flow and the vector of the water flow effected by gravity.

The embodiment of the cooling tower according to the invention which has been shown works as follows:

After starting the blower 13, suction commences in the lower part of the air duct 12 so that the surrounding air flows in the direction of arrow 23 between the cooling plates 20 and—directed upwardly—escapes in the direction of arrow 26 via the air duct 12 of the cooling tower.

The hot water to be cooled flows from the duct 16 via the bottom aperture 17 and the corresponding distributing and film-forming elements in the form of a water film on the cooling plates 20 and flowing down over these in the form of a film, the already cooled water is collected in the collecting tank or collecting duct 10.

As is apparent from the above description, the cooling air only comes into contact with a large surface area of water film.

In the case of an assembly of cooling towers of the kind shown in FIG. 3, the water collecting duct 10 and the water distributing duct 16 form the structural component of the system for the water to be cooled and for the cooled water of the whole series of towers. In the series of towers according to FIG. 5, the distributing and collecting ducts of the individual cooling towers, form, at the same time, the distributing and collecting system of the entire system, which results in a considerable saving in investment costs of the plant.

If no sufficient space is available below the cooling tower shown in FIG. 1, the pump housing 19 shown in broken lines, can be fitted inside.

The cooling tower of FIGURE 1 can also be made round (FIG. 2, left half) or polygonal (FIG. 2, right half). In these cases the cooling plates 20 are mounted around the central axis of the cooling tower.

The cooling tower according to the invention can also be so constructed that the cooling plates 20 are disposed in two rows behind one another, i.e. so that the two rows as regards the air flow—are in series.

If also a water distributing device and furthermore a blower is provided, the motors and valve means are preferably arranged so as to be operated and controlled from control panels.

As already mentioned, the main advantage of the cooling tower according to the invention resides in its low direct, as well as indirect investment costs. A further advantage is ensured by the relatively low height of the structure and the reduced expenditure for pumping and operational costs, connected therewith. A further advantage in reducing the work necessary for operating is the fact that a considerably lower power is required for the flow of air brought into contact with the water film than for the flow through a sprayed water curtain. Also the designing of towers according to the invention is advantageous since the connection points and joints are situated at the same places as in known cooling towers.

Dependent on requirements the cooling surfaces of the cooling tower according to the invention, can be made of metal, asbestos, cement, wood, glass, plastics, etc.

What we claim is:

1. A cooling tower having a central fan rotatable about an upright axis, an air intake aperture disposed outwardly of the horizontal projection of said fan, cooling elements disposed in said aperture, said cooling elements having upright flat cooling surfaces thereon disposed in confronting relation with each other whereby air passing in between said surfaces flows in one direction only into said fan parallel to said surfaces, and means for directing flat upright films of water to flow by gravity over and parallel to said surfaces, said directing means being elements whose cross section is of inverted Y shape disposed between each pair of confronting surfaces with the free ends of the legs of the Y spaced from said surfaces by narrow slots adjacent the upper edges of said surfaces through which water flows to form said films, thereby to provide flat films of water flowing transversely down along said surfaces in a direction transverse to the direction of flow of air between said surfaces and into said fan.

References Cited

UNITED STATES PATENTS

| | | | |
|---|---|---|---|
| 1,987,881 | 1/1935 | Seggern et al. | |
| 2,608,398 | 8/1952 | Park et al. | |
| 3,333,835 | 8/1967 | De Flon. | |
| 3,363,885 | 1/1968 | Meek | 261—112 X |
| 2,971,750 | 2/1961 | Boling. | |
| 3,044,237 | 7/1962 | Mart. | |
| 3,099,696 | 7/1963 | Meek | 261—112 XR |
| 3,262,682 | 7/1966 | Bredberg | 261—112 XR |
| 3,301,401 | 1/1967 | Hall | 211—112 XR |
| 3,313,533 | 4/1967 | Powers | 261—112 XR |
| 3,322,409 | 5/1967 | Reed. | |

TIM R. MILES, Primary Examiner

U.S. Cl. X.R.

261—112